Nov. 5, 1929.  A. R. PRIBIL  1,734,778
PICK-UP TRUCK
Filed Sept. 23, 1927
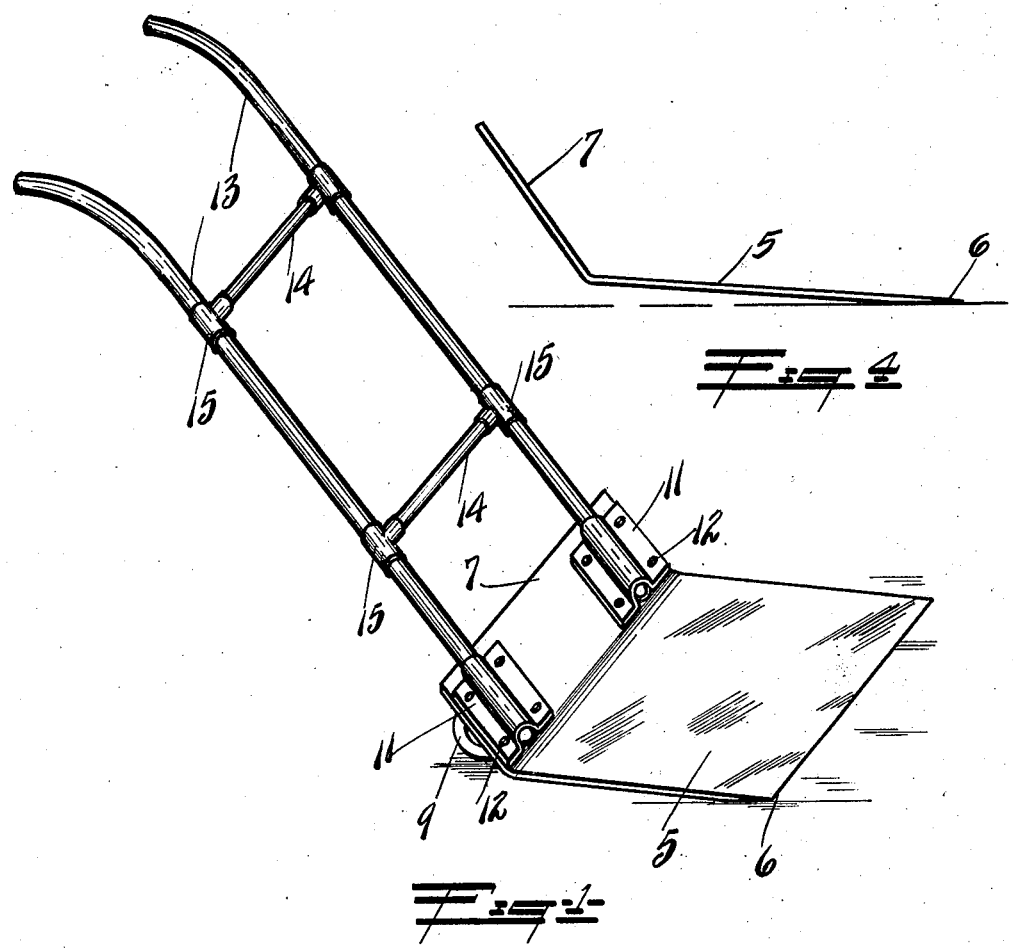
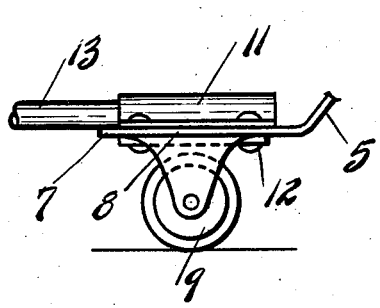
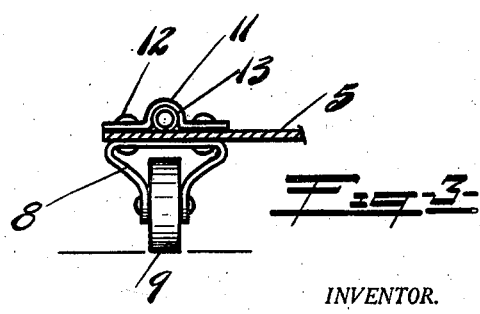
INVENTOR.
Alexis R. Pribil.
BY Frank C. Harman.
ATTORNEY.

Patented Nov. 5, 1929

1,734,778

UNITED STATES PATENT OFFICE

ALEXIS R. PRIBIL, OF SAGINAW, MICHIGAN

PICK-UP TRUCK

Application filed September 23, 1927. Serial No. 221,424.

This invention relates to trucks and the like and particularly to a pick up truck, for picking up and transporting heavy boxes, barrels and heavy articles and packages of various kinds and shapes.

The prime object of the invention is to design a truck with which one workman can pick up and easily and rapidly move a heavy load with a minimum of effort.

Another object is to provide a sturdy, substantial, durable and easy operated pick up truck, composed of few parts, very economical to manufacture, and easy to assemble.

A further object is to design a pick up truck having a platform formed of steel plate, the end of which is knife edged so that it can be easily forced in under the piece or package to be moved, making it unnecessary to tilt, lift, or otherwise move the package to get it onto the platform.

The above and other objects will appear as the specification progresses, reference being had to the accompanying drawing in which I have shown the preferred embodiment of my invention, and in which like reference numerals indicate like parts throughout the several views thereof.

In the drawing:

Fig. 1 is an isometric view of my improved pick up truck.

Fig. 2 is an enlarged view showing the caster and handle socket.

Fig. 3 is a part sectional end view.

Fig. 4 is a detail edge view of the sheet metal platform.

This truck is especially designed for use in stores, warehouses, factories, etc., for the handling and transporting of boxes, barrels, packages, and articles of various kinds. The casters are made up of stampings having bearings and the platform is of plate construction with a knife edged front end, the entire design being light in weight, yet capable of handling heavier loads than the heavy trucks at present in general use, with far less effort, and in less time.

Referring now particularly to the drawing, the numeral 5 indicates a plate platform, the front end 6 of which is knife edged as shown, so that it can be readily pushed in under the article to be moved, the back end 7 being bent at an angle. A pair of saddle members 8 are secured thereto, wheels 9 being revolubly journaled on shafts 10 mounted in said saddles, and being adapted to support the truck in the usual manner.

Sockets 11 are provided on the face of this platform 7 in spaced apart relation, and bolts 12 are provided for securing the saddles and sockets respectively to the plate, the bolt receiving openings in the sockets, platform and saddle respectively being in direct alignment, so that one set of bolts secures both the sockets and saddles in place. Handles 13 are clamped in these sockets 11 and project upwardly, being preferably formed of piping, the free ends being curved and bent outwardly to provide the proper grip and leverage for handling the truck and loads carried thereby. Braces 14 serve to reinforce and hold the handles in proper relation, and these braces may be in the form of pipe sections having T fittings 15 secured to the handles, or may be in the form of bars (not shown) which can be clamped to the pipe by means of rivets or the like.

This construction is light in weight, very rigid and substantial, and can be economically manufactured and assembled.

What I claim is:—

In a pick up truck, the combination with a single flat sheet metal platform having an upwardly angled rear section, the under side of the front edge of which is ground to form a sharp edge, spaced apart clamps secured to the rear section, and tubular handles clamped therein, sheet metal saddles secured to the rear section directly below the clamps, and wheels journaled in said saddles.

In testimony whereof I hereunto affix my signature.

ALEXIS R. PRIBIL.